US005191155A

United States Patent [19]

Driemel et al.

[11] Patent Number: 5,191,155

[45] Date of Patent: Mar. 2, 1993

[54] PROCESS FOR NONPOLLUTING DESTRUCTION OF POLYCHLORINATED WASTE MATERIALS

[75] Inventors: Klaus Driemel; Joachim Wolf; Wolfgang Schwarz, all of Duisburg, Fed. Rep. of Germany

[73] Assignee: Grillo-Werke AG, Duisburg, Fed. Rep. of Germany

[21] Appl. No.: 771,570

[22] Filed: Oct. 7, 1991

Related U.S. Application Data

[63] Continuation of Ser. No. 162,139, Feb. 29, 1988, abandoned.

[30] Foreign Application Priority Data

Mar. 14, 1987 [DE] Fed. Rep. of Germany ....... 3708310

[51] Int. Cl.[5] ........................ A62D 3/00; C01B 17/50; C01G 17/00; F23G 7/04

[52] U.S. Cl. .................................... 588/209; 588/207; 423/531; 423/659; 110/236; 110/346

[58] Field of Search .................. 423/655, 531; 208/13; 110/236, 237, 245, 246, 346; 588/207, 209

[56] References Cited

U.S. PATENT DOCUMENTS

| | | | |
|---|---|---|---|
| 4,073,871 | 2/1978 | Ortiz et al. | 423/240 R |
| 4,133,273 | 1/1979 | Glewnon | 110/237 |
| 4,376,107 | 3/1983 | Morgenthaler | 208/13 |
| 4,376,108 | 3/1983 | Lowicki et al. | 423/531 |
| 4,398,475 | 8/1983 | McKiel, Jr. | 110/346 |
| 4,402,274 | 9/1983 | Meenan et al. | 110/238 |
| 4,475,466 | 10/1984 | Gravery | 110/238 |

OTHER PUBLICATIONS

Rotman, David, 5 Super Fund Clean-Up, the Baring Question, Industrial Chemist, Jan. 1988 pp. 22-27.

*Primary Examiner*—Gary P. Straub
*Attorney, Agent, or Firm*—Wegner, Cantor, Mueller & Player

[57] ABSTRACT

Polychlorinated waste materials such as polychlorinated dibenzodioxines (PCDD), polychlorinated dibenzofuranes (PCDF) and polychlorinated biphenyls (PCB) are subjected to nonpolluting destruction by combusting said materials together with waste sulfuric acids, acid tars and similar sulfur- and carbon-containing waste products of various compositions and consistencies in a multi-stage combustion furnace.

7 Claims, No Drawings

PROCESS FOR NONPOLLUTING DESTRUCTION OF POLYCHLORINATED WASTE MATERIALS

This application is a continuation of U.S. application Ser. No. 162,139, filed Feb. 29, 1988, now abandoned, and priority is claimed under 35 USC. 120.

The present invention relates to a process for a nonpolluting destruction of polychlorinated waste materials, and more specifically of polychlorinated dibenzodioxines (PCDD), polychlorinated dibenzofuranes (PCDF) and polychlorinated biphenyls (PCB). Today the polychlorinated waste materials rank among the specially troublesome waste materials, since some are extremely toxic even in low amounts and cause long-lasting damage. It is known that these waste materials are destroyed only incompletely in simple combustion units or garbage incineration plants and, thus, produce unacceptable pollution and imperilment of the environment.

By means of intensive investigations it has now been determined that it is possible, safely and without serious problems, to destroy these waste materials by combustion of these substances or combustible residual materials contaminated with these substances together with waste sulfuric acid, acid tars and similar sulfur- and carbon-containing waste products, of various compositions and consistencies, in a multi-stage combustion furnace.

In a first stage, the waste sulfuric acid, acid tars and similar sulfur- and carbon-containing waste products of various compositions and consistencies, if desired together with elementary sulfur, are charged into a rotary furnace containing a coke bed at a temperature of at least 400° C. and about 25 to 55% of the total amount of air required for the whole or overall process are blown in as primary air, so that the resultant reducing gas mixture and the rear part of the coke bed will be heated to about 800° C. to 1100° C. Any excess of coke is discharged at the end of the rotary kiln.

In a second stage, the gas mixture is fed from the rotary furnace into an intermediate combustion chamber and mixed with an additional quantity of about 10 to 15% of the total amount of air required for the overall process while a volume velocity per hour of about 200 to 400 $Nm^3$ of gas per $m^3$ of combustion space is maintained, and while the temperature of the gas mixture will increase to about 1150° C. to 1350° C.

In a third stage, the gas from the intermediate combustion chamber is fed into the forward combustion space of a secondary combustion chamber and mixed with a quantity of about 20 to 45% of the amount of air required for the overall process, while a volume velocity per hour of about 50 to 180 $Nm^3$ of gas per $m^3$ of combustion space is maintained; the separation gas mixture in the forward combustion space of the secondary combustion chamber will cool to about 1000° C. to 1200° C.

In a fourth stage, the remaining portion of the total air required in the overall process is fed into the center portion of the secondary combustion chamber and mixed with the separation gas, so that in the rear part of the secondary combustion chamber a temperature of about 1000° C. to 1200° C. is obtained and a volume velocity per hour of about 150 to 400 $m^3$ of gas per $m^3$ of combustion space is maintained. The gas mixture which has undergone complete reaction is removed and cooled in a known manner in a waste heat boiler and can be re-processed to produce sulfuric acid, preferably in a sulfuric acid contact process.

A method for reclaiming waste sulfuric acids, acid tars and similar sulfur- and carbon-containing waste products of various compositions and consistencies is subject matter of German Application No. DE-OS 29 47 497, corresponding to U.S. Pat. No. 4,376,108. That process has also proven to be reliable and economical for the purposes of the instant invention as it meets an essential requirement for the nonpolluting removal of polychlorinated waste materials. However, it was entirely unknown how polychlorinated waste materials would behave under the process conditions of this method for re-processing waste sulfuric acids, so that no predictions were possible as to whether the polychlorinated waste materials would undergo complete combustion and whether the chlorine-containing products formed thereby would interfere with the course of the reaction.

Surprisingly it has been found that no malfunctions occur and that no unburnt residues of the polychlorinated waste materials are formed in the crack gas or in the solid combustion residues.

To establish these results, comprehensive and detailed investigations and measurements were necessary and the methods of measurement themselves had to be checked for reliability under the process conditions. Eventually it was required to vary the process condition in order to determine whether or not a variation of the process conditions would nevertheless result in an emission of inadmissibly high amounts of produced or unburnt polychlorinated waste materials. Furthermore it was required to identify the contents of polychlorinated substances in the waste materials to be employed.

Finally the results showed that even upon addition of a significant amount of polychlorinated waste materials these materials are detectable neither in the crack gas nor in the pure gases, which means that these materials have been eliminated or at least been reduced to a level below the limit of detection.

Thus, for example, the present limit of detection for 2,3,7,8-TCDD in the crack gas is about 0.02 micrograms/$m^3$. Thus, the process according to U.S. Pat. No. 4,376,108 can be used without problems also for the extermination of polychlorinated waste materials.

EXAMPLE

Used was the equipment for decomposing waste sulfuric acids as available on Applicants' premises. Said equipment exists of two rotary kiln of identical constructions each having one intermediate combustion chamber and two secondary burning chambers and one downstream waste-heat boiler. The process gases from the two furnaces are combined behind the waste heat boilers and purified in two washing plants and one electrofilter. In a washing battery consisting of four absorbers connected in line the sulfur dioxide is removed from the waste gas and then passed to a plant for further processing same. The waste gas is passed through an alkaline washing stage and then vented through a stack.

In the rotary kiln there is maintained a coke bed temperature of about 1000° C. The coke breeze is continuously withdrawn at the end of the rotary kiln. The gas mixture produced in the rotary kiln in a reducing atmosphere and containing sulfur vapor, hydrogen sulfide, carbon oxidesulfide, carbon monoxide and hydrocarbons leaves the rotary kiln at a temperature of from 900°

C. to 1 000° C. and enters an intermediate chamber. Here the vapors as still present of $H_2SO_4$ and sulfur trioxide are completely reduced to $SO_2$ at a temperature of 1200° C. to 1300° C., and higher hydrocarbons are cracked and converted into lower molecular weight compounds which are capable of undergoing a more rapid combustion in the secondary combustion chambers. In the secondary combustion chamber there occurs the further complete combustion of all combustible gases and vapors, an oxygen excess of from 1 to 2% being desired, and the final gas being discharged from the secondary combustion chamber at a temperature of from 1080° C. to 1200° C.

The process gas is subsequently cooled to about 350° C. with steam generation. Then the gas is passed to the waste gas purification.

The combustion temperatures are monitored at altogether seven sites for measuring the temperatures by means of thermocouples.

The pressure relations are measured and recorded at the gas inlet of the intermediate chamber, at the gas outlet of the waste heat boiler and in the gas pipe behind the hot gas blower. In the waste heat boiler there is a probe for the determination of the contents of oxygen, sulfur dioxide, carbon dioxide and carbon monoxide. The concentrations are continuously measured, displayed and recorded.

Four series of measurements were carried out altogether, namely one blank measurement in the absence of used oil, measurement I with 100 kg/h of used oil containing 500 ppm of PCB per furnace, measurement II with 100 kg/h of used oil containing 1000 ppm of PCB per furnace, and measurement III with 250 kg/h of used oil containing 1000 ppm of PCB per furnace.

In addition to the conventional measurements of the gas components as conducted, gas samples were taken, and examined according to the method elaborated by the Rheinisch-Westfälischer Technischer Überwachungsverein. To this end, samples of the waste gas are taken at a temperature up to 773 K and cooled to a temperature below 323 K. Hereupon, vaporous compounds will condense and in part be adsorbed to solid particles present. The particles contained in the mixed gas are deposited on appropriate filters, and the finest particles and readily volatile compounds are adsorbed in a subsequent bed of solid material. As the sorbent there was used Florisil in the blank series and in the series of measurements I and III and XAD-2 in the measurement series II. Comparative measurements using the sorbents Parapak PS, XAD-2 and Florisil showed that the sorptive depositions of PCDD and PCDF are of equal amounts and, thus, produce the same results. The volume streams in the waste gas and in the cooling air were controlled by means of a computer employing electronic data acquisition and evaluation of the filter temperature, probe cross section and the state of the waste gas so that isokinetic partial flow take-offs were ensured. In the measurement of pure gas, filter temperatures of 301 K were maintained, with a partial gas amount removed by suction of 3.5 $m^3/h$ and a dilution factor of about 1:5. The filter temperature during crude gas measurement was 313 K, with a partial gas amount removed by suction of averaging to 2.2 $m^3/h$ at a dilution factor of 1:10. The cooling air was pre-cooled by means of water in a countercurrent-heat exchanger. Upon completion of the measurements the sample fractions, filters and solid sorbents were packaged such as to be protected from heat and irradiation of light and passed to analysis.

Prior to the extraction, all samples were admixed with a mixture of the following $C^{13}$-labelled PCDD: 5 ng of 2,3,7,8-TCDD, 5 ng of 1,2,3,7,8-pentaCDD, 5 ng of 1,2,3,6,7,8-hexa-CDD, 10 ng of 1,2,3,4,6,7,8-hepta CDD and 10 ng of OCDD. The filters of the crude and pure gas samples were extracted and analyzed by chromatography. The analytical results showed that in the pure gases no polychlorinated waste materials were detectable and, thus, the amounts thereof are significantly below the limit of detection. The limit of detection for 2,3,7,8-TCDD was about 0.02 $ng/m^3$. The emissions as admitted by the Environmental Authorities are 0.1 $ng/m^3$ for the time being.

We claim:

1. A process for nonpolluting removal of polychlorinated waste materials and the recovery of sulfur dioxide characterized in that polychlorinated waste materials or combustible residual materials contaminated with said polychlorinated waste materials are subjected to combustion together with waste sulfuric acid, acid tars or similar sulfur- and carbon-containing waste products in a multi-stage combustion furnace, the combustion comprising a four stage process wherein:

(a) in a first stage, the waste sulfuric acid, acid tars or sulfur- or carbon-containing waste products and the polychlorinated waste materials are fed into a rotary furnace containing a coke bed at a temperature of at least 400° C. together with an amount of air equal to about 25 to 55% of the total amount of air required for the four stage process, so that the resultant reducing gas mixture is heated to about 800° C. to 1100° C., wherein said polychlorinated waste materials fed into said rotary furnace include at least one of polychlorinated dibenzodioxines, polychlorinated dibenzofuranes or polychlorinated biphenyls;

(b) in a second stage, the reducing gas mixture is fed from the rotary furnace to an intermediate combustion chamber and admixed with about 10 to 15% of the amount of air required for the four stage process, while a volume velocity per hour of about 200 to 400 $Nm^3$ of gas/$m^3$ of combustion space is maintained and the temperature of the gas mixture increases to about 1150° C. to 1350° C.;

(c) in a third stage, the gas from the intermediate combustion chamber is fed into the forward combustion space of a secondary combustion chamber and mixed with about 20 to 45% of the amount of air required for the four stage process, while a volume velocity per hour of about 50 to 180 $Nm^3$ of gas/$m^3$ of combustion space is maintained and the separation gas cools to about 1000° C. to 1200° C.; and (d) in a fourth stage, the remaining portion of the total air required in the fourth stage process is fed into the center portion of the secondary combustion chamber and mixed with the separation gas so that in the rear part of the secondary combustion chamber a temperature of about 1000° C. to 1200° C. is obtained, a volume velocity per hour of about 150 to 400 $Nm^3$ of gas per $m^3$ of combustion space is maintained, and an oxygen excess of 1 to 2% for the four stage process is provided; and the process gases cooled, sulfur dioxide removed from the process gases, and then the gases purified by washing.

2. Process of claim 1 wherein, in the first stage, elementary sulfur is added to the waste products fed into the rotary furnace.

3. Process of claim 2 wherein, the removed $SO_2$ is reprocessed to produce sulfuric acid.

4. Process of claim 1 wherein, the removed $SO_2$ is reprocessed to produce sulfuric acid.

5. Process according to claim 1, wherein said cooling is done in a waste heat boiler.

6. Process according to claim 1, in which the sulfur-containing waste product is spent sulfuric acid or acid tar.

7. Process according to claim 1, wherein a content of polychlorinated dibenzodioxines, polychlorinated dibenzofuranes or polychlorinated biphenyls in the purified gases exiting from said process is less than 0.1 $ng/m^3$.

* * * * *